United States Patent
Zey

(10) Patent No.: US 6,190,105 B1
(45) Date of Patent: Feb. 20, 2001

(54) RECIPROCATING FLOOR SCRAPER FOR DISCHARGING BULK MATERIAL FROM A SILO

(75) Inventor: Wolfgang Zey, Eningen (DE)

(73) Assignee: Putzmeister Akiengesellschaft (DE)

( * ) Notice: Under 35 U.S.C. 154(b), the term of this patent shall be extended for 0 days.

(21) Appl. No.: 09/341,770

(22) PCT Filed: May 8, 1998

(86) PCT No.: PCT/EP98/02711

§ 371 Date: Jul. 16, 1999

§ 102(e) Date: Jul. 16, 1999

(87) PCT Pub. No.: WO98/55382

PCT Pub. Date: Dec. 10, 1998

(30) Foreign Application Priority Data

Jun. 4, 1997 (DE) .............................................. 197 23 357

(51) Int. Cl.[7] .............................. B65G 65/44; B65D 88/66
(52) U.S. Cl. ......................... 414/306; 414/326; 414/328
(58) Field of Search .................................. 414/304–308, 414/325–328, 198; 198/736, 737, 747, 749; 222/233, 234, 252, 280, 409; 110/109, 165 R, 166, 167, 170

(56) References Cited

U.S. PATENT DOCUMENTS

| | | | |
|---|---|---|---|
| 1,837,994 | * 12/1931 | Preston ................................. | 198/747 |
| 3,923,149 | * 12/1975 | Stearns ................................. | 198/747 |
| 4,043,488 | * 8/1977 | Halvorsen et al. ............... | 222/234 X |
| 4,157,761 | * 6/1979 | Debor ................................... | 414/304 |
| 4,363,586 | * 12/1982 | Gessler et al. ...................... | 414/325 |
| 4,731,179 | * 3/1988 | De Baere ............................. | 210/251 |
| 4,763,777 | * 8/1988 | Hooper et al. .................. | 414/306 X |
| 5,249,914 | * 10/1993 | Cahlander et al. ............... | 414/793.4 |
| 5,407,103 | * 4/1995 | Clarström et al. ............... | 222/233 X |

FOREIGN PATENT DOCUMENTS

| | | | |
|---|---|---|---|
| 28 08 430 | * 8/1979 | (DE) ..................................... | 414/306 |
| 35 11 177 | * 10/1986 | (DE) ..................................... | 414/306 |
| 39 06 253 | * 8/1990 | (DE) ..................................... | 414/306 |
| 662436 | * 7/1995 | (EP) ..................................... | 414/306 |

\* cited by examiner

*Primary Examiner*—Robert P. Olszewski
*Assistant Examiner*—Gerald J. O'Connor
(74) *Attorney, Agent, or Firm*—Pendorf & Cutliff

(57) ABSTRACT

Device for discharging material from a silo (10), comprising a long discharge channel (22) extending centrally over the silo floor (14), and a push-frame (20) which can be pushed back and forth hydraulically over the silo floor (14), over the discharge channel (22), crossways to the longitudinal extension of said discharge channel (22). According to the invention, the push-frame (20) is driven by means of two radially arranged hydraulic cylinders (40) which face each other diametrically inside the silo (10). The hydraulic cylinders can be activated with a push-pull control mechanism, and are each situated in a cylinder housing, said cylinder housing being connected to the silo floor (14). The piston rods (46) of the hydraulic cylinders are arranged so that their opposite front faces (44) fit against a driver bearing (48) from opposite sides, said driver bearing (48) being located in the center of the push-frame (20).

22 Claims, 5 Drawing Sheets

RECIPROCATING FLOOR SCRAPER FOR DISCHARGING BULK MATERIAL FROM A SILO

BACKGROUND OF THE INVENTION

Field of the Invention

The invention relates to a device for discharging material from a silo, comprising an elongate discharge opening or channel extending centrally over the silo floor and a push-frame which can be pushed back and forth hydraulically over the silo floor crossways to the longitudinal extension of the discharge channel.

In silos for thick matter and for non-flowing bulk material an additional discharging aid is necessary, which can be in the form of a hydraulic-driven push-frame. The push-frame, while pushing back and forth with its frame crossbeams and struts, engages the material near the floor of the silo and shifts this material in the direction of the discharging opening or channel. In the discharging channel a discharging conveyor can, for example, be mounted in form of a screw conveyor, which transports the material it receives to the outside. The push-frame is normally driven by a hydraulic cylinder, which projects outward beyond the silo casing near the floor and which is connected with the push-frame by its piston rod through an opening in the silo casing. In this manner of construction, piston rods are employed with a relatively long unsupported length over which buckling can occur, and which are exposed to a very high wear-and-tear within the silo container. Additionally, the push-frame drive media comprises a hydraulic oil, which can, in case of a leakage, lead to an unacceptable pollution danger.

SUMMARY OF THE INVENTION

Based thereon, the present invention has task of developing a device for discharging material as described above, which comprises a more efficient introduction of power and improved service life.

The inventive solution is primarily based on the concept that by mounting the hydraulic cylinder driving the push-frame within the silo, a shortening of the piston rods, an improvement of the introduction of power, and an improved guidance of the pushframe can be achieved. In order to accomplish this, it is proposed according to the invention to mount inside the silo a radially extending hydraulic cylinder, which is provided in a cylinder housing connected with the silo-floor, and which with the front face of a piston rod, which is inside a radially inwards directed housing opening, is connected to a driver bearing which is connected to the push-frame.

According to a preferred embodiment of the invention two diametrically opposed radially arranged hydraulic cylinders are provided facing each other inside the silo and controlled in phase opposition in push-pull manner, which are respectively provided in cylinder housings connected with the silo floor, and with piston rods or plungers which extend through respective radially inward facing openings through the housing, which with their opposing front faces fit radially against a driver bearing which is located centrally in the push-frame. By these measures one achieves an optimal force transmission in the central area of the push-frame and a substantial reduction in piston rod length. Further, the two cylinder housings can exhibit on their outer surface a thrust guide for the push-frame, to thereby provide a twist-free and low friction guidance of the push-frame.

In the discharge channel there is preferably a discharge aid, preferably in the form of a screw conveyor, via which the received material can be transported via a central or peripheral outlet opening to the outside.

In order to make possible a high serviceability of the hydraulic cylinders despite the placement within the inner space of the silo, it is proposed according to an advantageous embodiment of the invention, that the cylinder housing respectively extends to the outer edge of the silo floor and is accessible from the outside of this silo via a closable radial opening. A further improvement in this respect can by achieved thereby, when the cylinder housing is in communication with an access opening provided in the silo floor. This makes possible an access to the hydraulic cylinder from the bottom side of the silo floor. The cylinder housing extends beginning with the edge of the floor and preferably respectively over one quarter of the floor diameter, wherein on the inner side of the housing also a guide bushing for the plunger or the piston rod can be provided. The guide bushing can supplementally be provided with rinsing or cleaning channels, via which the piston rod or the plunger can be cleansed with rinsing water.

The silo floor preferably exhibits a circular circumference, while the push-frame is comprised of two mirror-image shaped frame segments, which at their connected facing ends can form an obtuse angle. The push-frame preferably exhibits cross beams and/or frame struts, which on the side opposite to the side facing the floor exhibit a roof like profile over which the material during displacement of the push-frame can easily flow. According to a further preferred embodiment of the invention the push-frame exhibits two spaced apart traverses or transoms or traverse guide arms provided slidingly upon the outside of the housing against the push control, which border against an upwards and downwards open guide frame longitudinally extending within the push pull frame. The driver bearing thereby preferably extends between the two traverses in the central area of the push-frame, which in the area of their ends, on the side opposite the side facing the floor, are connected with each other via a cross beam or tie. On the basis of the inventive arrangement of the hydraulic cylinder on the inside of the silo it is possible to form the hydraulic cylinder as a plunger cylinder, of which the plunger with its free face end lies against the driver bearing. The piston rods of the plunger can on their end faces be formed as convex ball- or cylindrical cups or spherical indentations, while the driver bearing exhibits a concave abutment surface corresponding to the ball- or cylinder hemisphere. This arrangement makes possible a form-fitting assembly of the frame under tension between the piston rods; supplemental screw connections or mechanical couplings are not required.

In order to avoid the danger of a contamination with hydraulic oil in the case of a leak, it is proposed in accordance with a preferred or alternative embodiment of the invention, that the hydraulic driver means for the push-frame is acted upon by water as the hydraulic force.

BRIEF DESCRIPTION OF THE DRAWING

In the following the invention will be described in greater detail by reference to the inventive embodiment shown in the figures in schematic manner. There are shown FIG. 1 a silo with push-frame in partial break-away perspective representation.

DETAILED DESCRIPTION OF THE INVENTION

Figure 1:
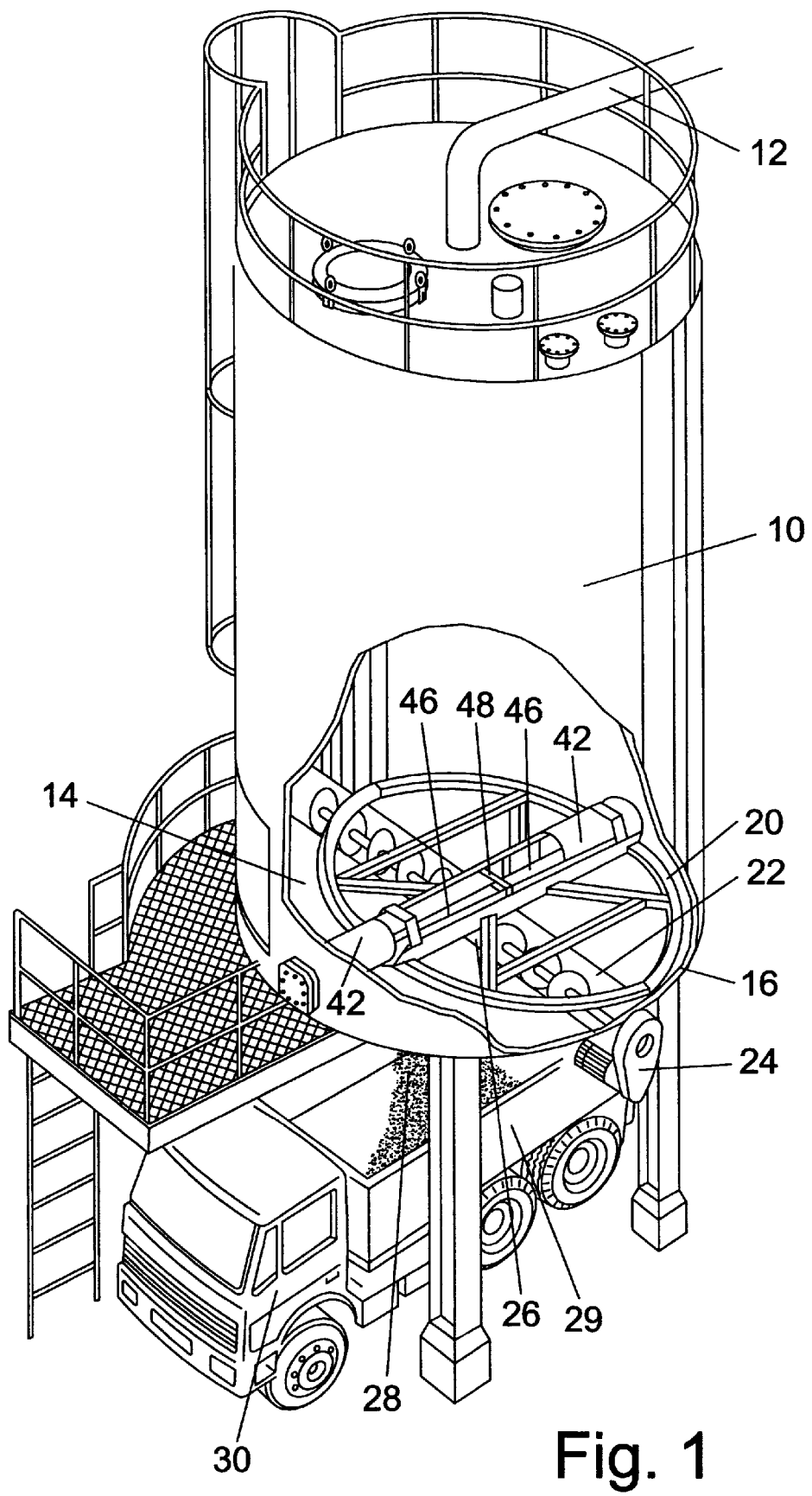
Figure 2:
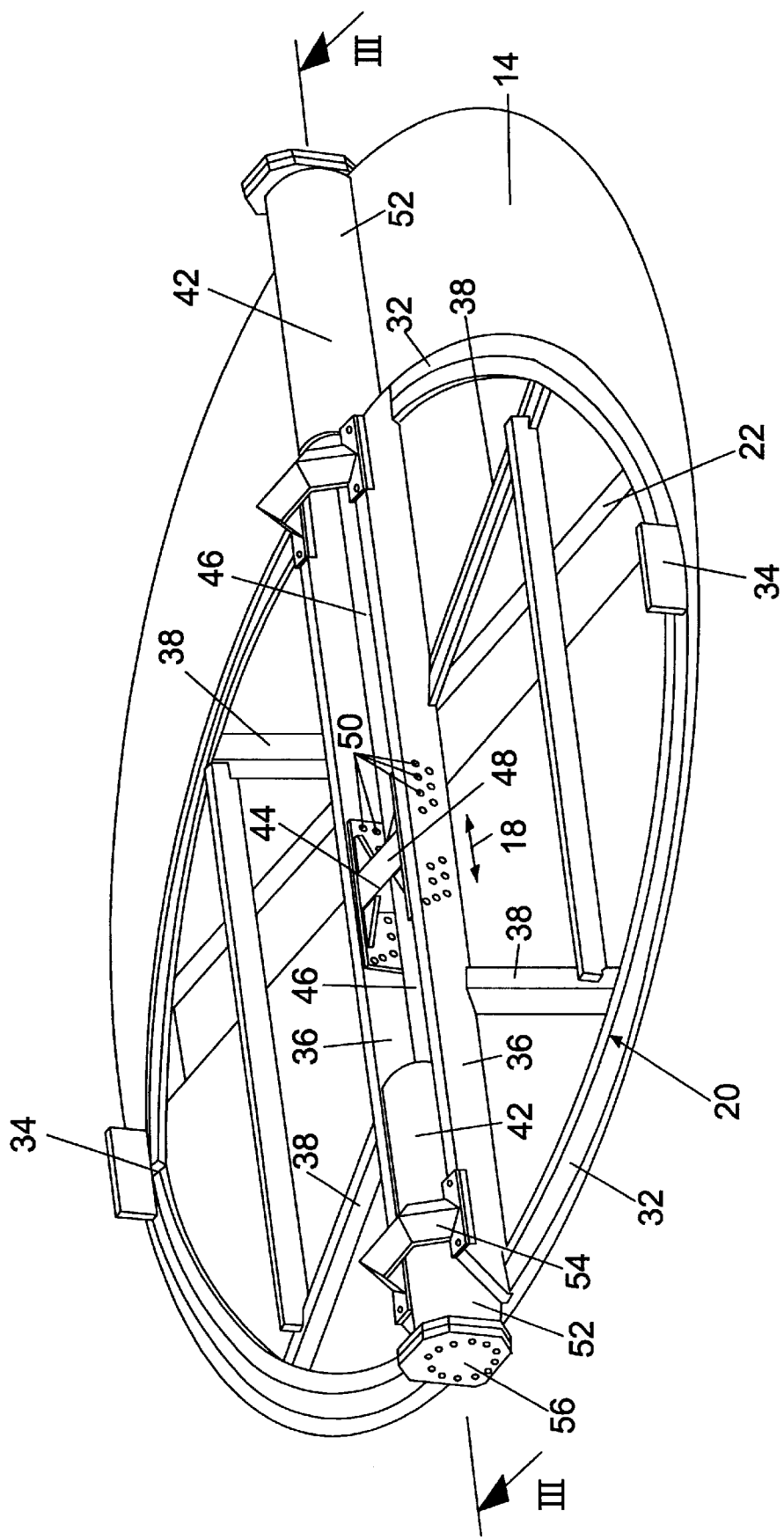
FIG. 2 a perspective representation of the silo floor with push-frame and push-frame driver.

The silo shown in FIG. 1 is comprised essentially of a cylindrical silo 10, which can be provisioned with bulk materials from above via a feed pipe 12 and which is provided in the area of the silo floor 14 with a device 16 for material discharge. The discharge device includes a push-frame 20 displaceable back and forth on the silo floor in the direction of the double arrow 18, as well as a discharge conveyor 24 provided below the push-frame 20 in a longitudinally extending discharge channel of the silo floor. The discharge conveyor opens in the shown embodiment into an outlet opening 26 provided centrally below the silo floor 14, via which the bulk material 28 can be transported to a receiving surface located below the silo (loading surface 29 of a truck 30). Alternatively, a funnel for a pump charging unit can be provided directly below the outlet opening 26. The push-frame 20 exhibits two, mirror image arranged, arc shaped frame struts or cross beams 32, which on their contacting points 34 form an obtuse angle with each other and are connected by two spaced-apart traverses 36 and multiple struts or cross beams 38 providing stiffening of the push-frame.

The driving of the push-frame 20 occurs via two hydraulic cylinders 40 diametrically opposed to each other radially extending within the silo, which are respectively provided with cylinder housings 42 connected with the silo floor 14 and which with the opposing surfaces 44 of the piston rods 46 lie radially against the driver bearing provided centrally in the push-frame 20. The driver bearing 48 extends in the central area of the push-frame 20 between the two traverses 36 and is rigidly connected to these by means of rivet or screw fasteners 50.

The piston rods 46 extend radially into the inside of the silo through respectively a guide bushing 60 provided at the inner end of the hydraulic cylinder 40 and through a housing opening 62 and lie with their hemispherical shaped faces 44 in the area of a concave receiving surface 64 against the driver bearing 48.

Figure 3:
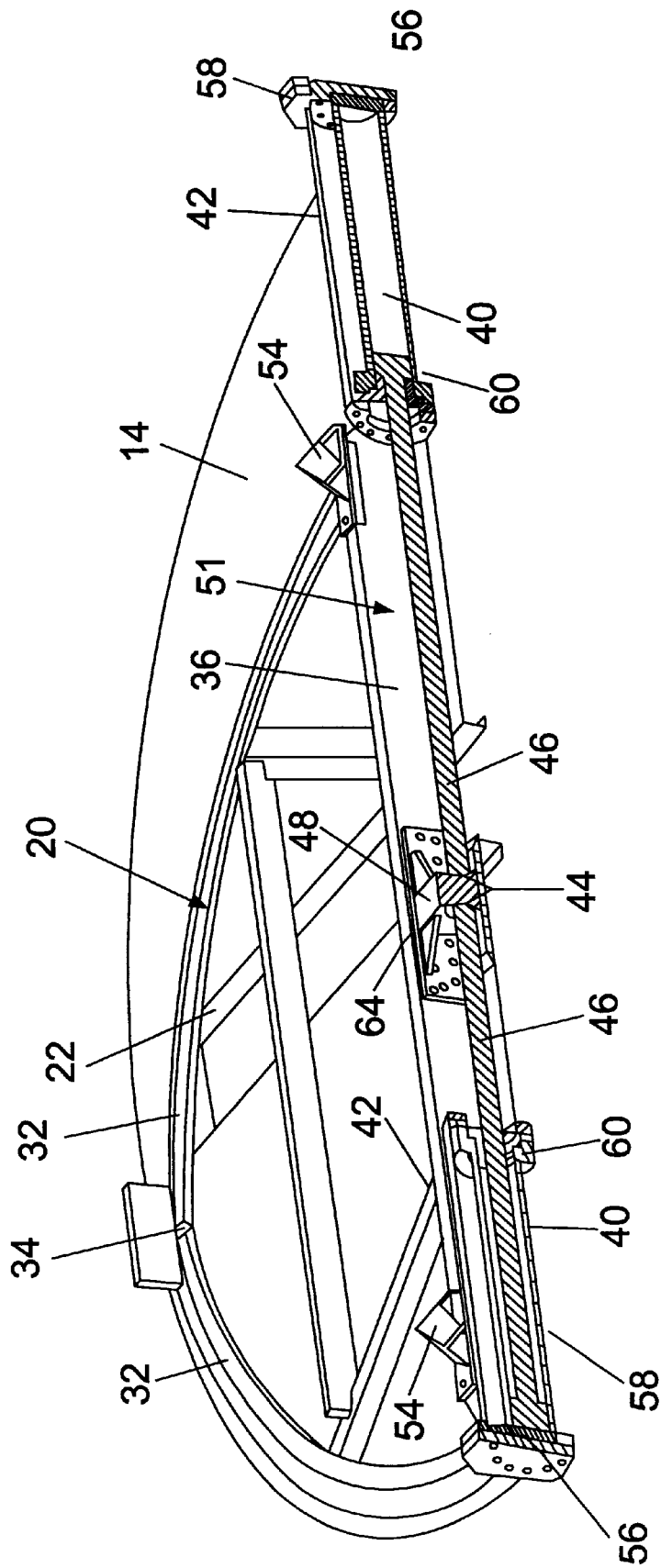
FIG. 3 a section along the section line with III—III of FIG. 2.
Figure 5:
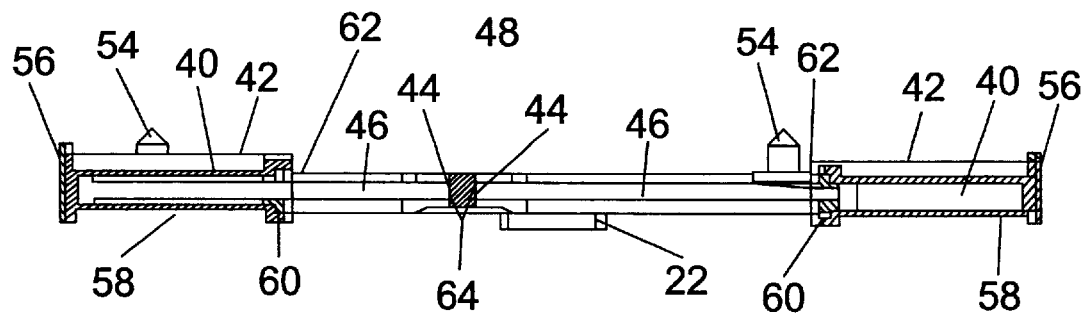
FIG. 5 a section along the section line V—V of FIG. 4.
Figure 4:
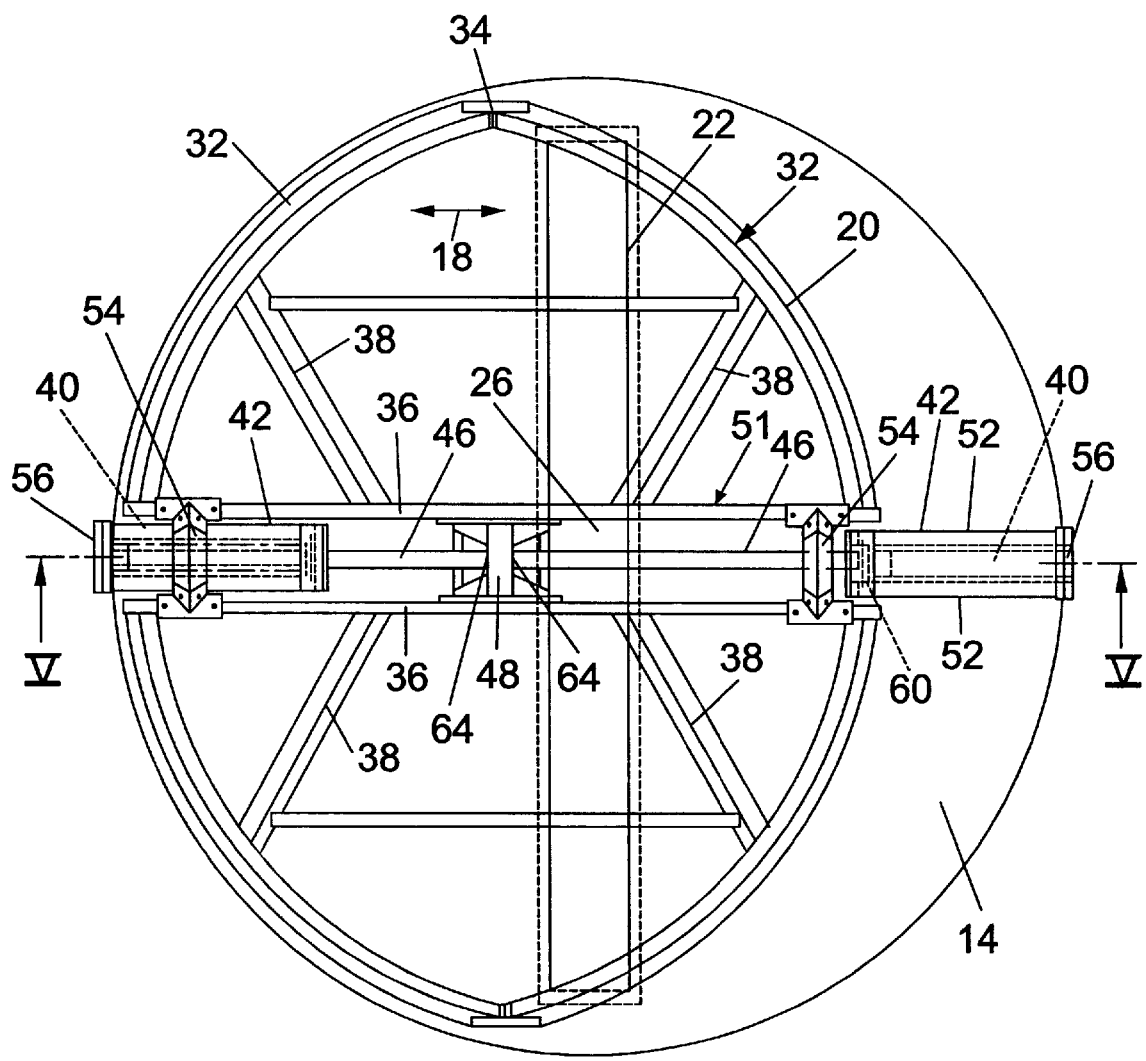
FIG. 4 a top view of the silo floor with push-frame.

The traverses 36 border within the push-frame 20 against an upwardly and downwardly open guide frame 51, which is guided in a thrust guide 52 formed on the outer surface of the cylinder housing 42. On its side opposite the side facing the silo floor 14 the traverse 36 are connected with each other by two cross pieces 54. The cylinder housings 42 are accessible from the outside of the silo through two service or access openings 57 closable by a removable flange lid 56. As can be seen from FIG. 3 and 5, the cylinder housings 42 are additionally accessible from the bottom side of the silo floor 14 through a floor opening 58 for maintenance and service purposes.

In each stroke movement of the push-frame 20 in the one or other direction material located close to the floor is pushed by the frame beam 32 and the struts 38 towards the discharge channel 22 and from there is carried out of the silo via the outlet conveyor 27. The roof-shaped or peaked profile of the outer frame 32 and the struts 38 ensure that during the reversed travel of the push-frame 20 the material located on the outside of the push-frame 20 comes into the inside of the push-frame 20 and during the subsequent returned stroke can be pushed in the direction of the outlet channel 22. The force transmission occurs via the piston rod 46, which on the basis of the provision of the hydraulic cylinder 40 on the inside of the silo can be designed to be relatively short.

Figure 6:
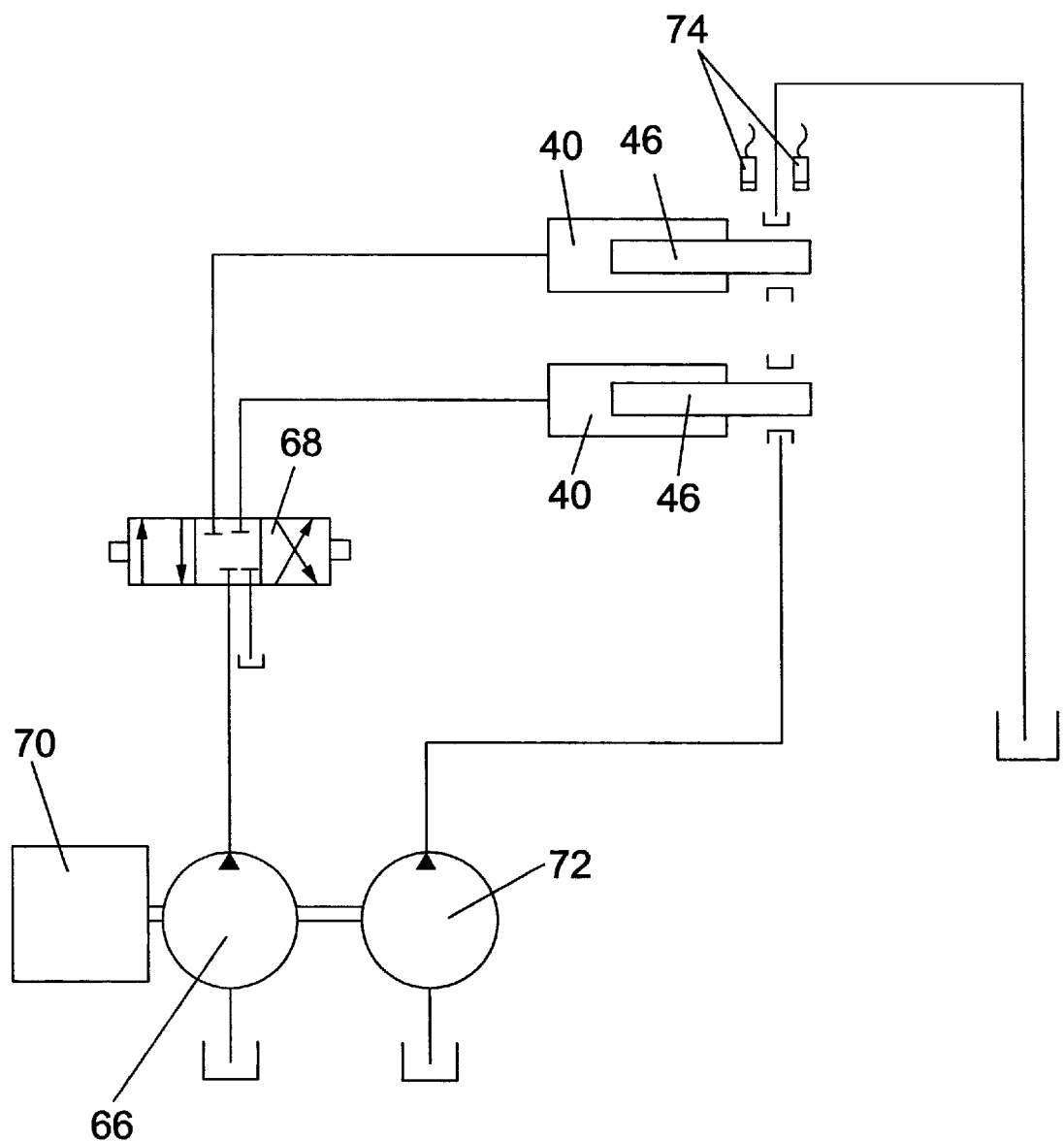
FIG. 6 a hydraulic schematic for the controlling and rinsing of the drive cylinder of the push-frame.

From the hydraulic schematic shown in FIG. 6 it can be seen that the hydraulic cylinders 40 are acted upon reciprocally in push-pull manner with pressure fluid via the hydraulic pump 66 and the flow directing valve 68. As pressure fluid, water is preferably employed. The reversing of the directional valve 68 occurs via a switch 74 operated by the piston rods 46 at their end positions. In the embodiment shown in FIG. 6 the pump motor 70 additionally drives a rinsing pump 72, via which the guide bushings 60 are impacted by water for cleaning of the piston rods 46.

In summary the following is to be concluded: The invention relates to a device for discharging material from a silo 10, comprising a long discharge channel 22 extending centrally over the silo floor 14, and a push-frame 20 which can be pushed back and forth hydraulically over the silo floor 14, over the discharge channel 22, crossways to the longitudinal extension of said discharge channel 22. According to the invention, the push-frame 20 is driven by means of two radially arranged hydraulic cylinders 40 which face each other diametrically opposed inside the silo 10. The hydraulic cylinders can be activated by a push-pull control mechanism, and are each situated in a cylinder housing, said cylinder housings being connected to the silo floor 14. The piston rods 46 of the hydraulic cylinders are arranged so that their opposite front faces 44 fit against a driver bearing 48 from opposite sides, said driver bearing 48 being located in the center of the push-frame 20.

What is claimed is:

1. Device for discharging material from a silo (10), said silo including a silo floor having an elongate discharge channel (22) extending centrally over the silo floor (14), said device comprising
    a push-frame (20) which can be pushed back and forth hydraulically over the silo floor (14) over the discharge channel (22) between first and second positions, wherein the push-frame is formed of first and second mirror-image arranged arc shaped frame segments (32),
    a driver bearing (48) located on the push-frame (20),
    at least one radially oriented hydraulic cylinder (40) provided on the inside of the silo, which cylinder is provided with a cylinder housing (42) connected with the silo floor (14), and
    a piston rod (46) projecting from said cylinder beyond a radially inwardly directed housing opening (62) and having an end surface (44) connected with said driver bearing (48).

2. Device according to claim 1, wherein the silo floor (14) exhibits a circular circumference.

3. Device according to claim 2, wherein the frame segments (32) form an obtuse angle at their facing, contacting points (34).

4. Device according to claim 1, wherein a single hydraulic cylinder is provided formed as a push-pull cylinder.

5. Device according to claim 1, wherein the push frame includes outer frames (32) and/or frames struts (38), which exhibit on their side opposite the side facing the silo floor a roof or peak profile.

6. Device according to claim 1, wherein the outlet opening opens into an outlet conveyor (24).

7. Device according to claim 1, wherein a discharge conveyor (24) is provided in the discharge channel (22).

8. Device according to claim 1, wherein a central outlet opening (26) is provided in the discharge channel (22).

9. Device for the discharge of material from a silo (10) with a silo floor (14), and an elongate discharge opening or channel (22) extending centrally longitudinally over the silo floor (14), said device comprising a push frame (20) hydraulically displaceable back and forth upon the silo floor (14) over the discharge opening or channel (22) and transversely to the longitudinal orientation of the elongage discharge opening, wherein at least one radially oriented hydraulic cylinder (40) is provided on the inside of the silo, which cylinder is provided with a cylinder housing (42) connected with the silo floor (14) and of which a piston rod (46) projecting beyond a radially inwardly directed housing opening (62), is connected at its end surface (44) with a driver bearing (48) located on the push-frame (20), wherein the hydraulic cylinder (40) is acted upon by water as the hydraulic pressure medium.

10. Device for discharging material from a silo (10), said silo including a silo floor having an elongate discharge channel opening or trough (22) extending centrally along the silo floor (14), said device comprising:

a push-frame (20) which can be pushed back and forth hydraulically over the silo floor (14) over the discharge channel (22) between first and second positions, wherein the push-frame is formed of first and second mirror-image arranged arc shaped frame segments (32), a driver bearing (48) located centrally in the push-frame (20), two radially arranged hydraulic cylinders (40), which face each other diametrically opposed inside the silo (10), which are controlled to operate in push-pull manner, each of which respectively being situated in cylinder housings (42) connected to the silo floor (14), two piston rods (46) or plungers projecting radially inwards from respective opposite housing openings (62), said piston rods or plungers having opposing faces, said opposing faces lying against said driver bearing (48).

11. Device according to claim 10, wherein the two cylinder housings (42) form on their outer surfaces a thrust guide (52) for the push-frame (20).

12. Device according to claim 11, wherein the push-frame (20) includes two elongate traverses (36) spaced apart, each traverse having first and second ends and a longitudinal axis oriented parallel to the direction of displacement (18) of the push-frame, and lying slidably against the thrust guide (52) on the outside of the cylinder housings.

13. Device according to claim 12, wherein the driver bearing (48) is situated in a central area of the push-frame (20) between the two traverses (36).

14. Device according to claim 12, wherein the traverses (36) border a guide frame (51) extending longitudinally within the push-frame (20) in the direction of the displacement movement (18) and open upwardly and downwardly.

15. Device according to claim 12, wherein the traverses (36) in the area of their first and second ends are connected to each other by a respective cross piece (54) spanning across on the side of the traverses opposite the side facing the silo floor (14).

16. Device according to claim 10, wherein the cylinder housings (42) respectively extend to the outer circumference of the silo floor (14) and are accessible from the outside of the silo via a radial opening which is closable by a lid (56).

17. Device according to claim 10, wherein at least one of the cylinder housings (42) is open to an access opening (58) in the silo floor (14), optionally closed by a closable floor plate.

18. Device according to claim 10, wherein each of said cylinder housings (42) extends beginning from the circumferential edge of the floor respectively over one quarter of the floor diameter.

19. Device according to claim 10, wherein said hydraulic cylinders (40) are formed as plunger cylinders, of which the plungers lie with their free end surfaces against the driver bearing (48).

20. Device according to claim 10, further including means for impacting the piston rod (46) or plunger with a rinsing liquid in the area of a radially inward directed guide bushing (60) on the inner end of the associated hydraulic cylinder (40).

21. Device according to claim 10, wherein the piston rods (46) or plungers on their end surfaces are formed as convex spherical or cylindrical surfaces and that the driver bearing respectively exhibits a corresponding receptacle surface (64).

22. Device according to claim 10, wherein the hydraulic cylinder (40) is acted upon by water as the hydraulic pressure means.

* * * * *